United States Patent [19]

Yoshii et al.

[11] Patent Number: 4,756,064
[45] Date of Patent: Jul. 12, 1988

[54] METHOD FOR MAKING CAPACITOR ELEMENTS

[75] Inventors: Toshiya Yoshii, Otsu; Kazuo Okabe, Shiga, both of Japan

[73] Assignee: Toray Industries, Inc., Tokyo, Japan

[21] Appl. No.: 13,280

[22] Filed: Feb. 11, 1987

Related U.S. Application Data

[62] Division of Ser. No. 697,845, Feb. 4, 1985, Pat. No. 4,708,905.

[30] Foreign Application Priority Data

Feb. 6, 1984 [JP] Japan ................................. 58-18244

[51] Int. Cl.$^4$ .............................................. H01G 7/00
[52] U.S. Cl. .................................. 29/25.42; 156/192;
156/324; 361/304; 361/323
[58] Field of Search ............... 29/25.42; 156/151, 192,
156/308.2, 324; 361/323, 304, 313; 427/79;
428/458

[56] References Cited

U.S. PATENT DOCUMENTS

| Re. 27,823 | 11/1973 | Cox | 361/313 X |
|---|---|---|---|
| 2,689,805 | 9/1954 | Croze et al. | 361/304 X |
| 2,975,345 | 3/1961 | Koller | 427/79 X |
| 3,212,163 | 10/1965 | Robinson | 29/25.42 |
| 4,007,295 | 2/1977 | Poliniak et al. | 427/79 X |
| 4,064,030 | 12/1977 | Nakai et al. | 204/192.36 |
| 4,414,053 | 11/1983 | Karim et al. | 156/308.2 |
| 4,613,560 | 9/1986 | Dueber et al. | 430/286 |

Primary Examiner—Mark Rosenbaum
Assistant Examiner—Andrew E. Rawlins
Attorney, Agent, or Firm—Austin R. Miller

[57] ABSTRACT

Capacitor elements having an ultra thin dielectric layer are made by the method of cutting a metal-deposited polyethylene terephthalate laminated film into a predetermined width, and then separating a metal-deposited polyethylene terephthalate film from the cut laminated film and successively forming the separated metal-deposited polyethylene terephthalate film into a coil. The metal-deposited polyethylene terephthalate laminated film is composed of an oriented ultra thin polyethylene terephthalate film having a thickness of 0.2 to 2.0 μm, on one surface of which a metal layer is formed by vacuum deposition and on the other surface of which a propylene copolymer support film is bonded with an adhesive force of 0.1 to 2.0 g/cm.

12 Claims, 1 Drawing Sheet

METHOD FOR MAKING CAPACITOR ELEMENTS

This is a division of application Ser. No. 697,845 filed Feb. 4, 1985 now U.S. Pat. No. 4,708,905 issued Nov. 24, 1987.

BACKGROUND OF THE INVENTION

(1) Field of the Invention

The present invention relates to a method for making an improved metal-deposited laminated film for a capacitor and a method for making a capacitor element by using this improved laminated film.

(2) Description of the Related Art

With the recent reductions in the size and weight of electric appliances, the size of capacitors used therein has been gradually reduced, and thus, a reduction in the thickness of the films used for the capacitors has become necessary. The thickness of a thinnest polyethylene terephthalate film now available is 1.5 μm, but this film is very difficult to handle because of the extreme thinness of the film. If a film having a further reduced thickness is developed, this film will be very effective for increasing the capacitance or reducing the size of a capacitor. However, if the film thickness is thus reduced, the stiffness of the film is drastically lowered and such operations as vacuum deposition on the film, slitting, element winding, coating, and lamination become very difficult. Thus it has been desired to develop a method by which capacitor elements having an ultra-thin dielectric layer can be advantageously made from an ultra-thin film.

As means for improving the poor operation adaptability of an ultra-thin film, there is known a method in which the ultra-thin film is laminated onto a different film to form a thick laminated film and, after processing, it is peeled off from this laminated film. For example, Japanese Unexamined Patent Publication No. 58-5226 discloses a method in which a laminated sheet is prepared by co-extrusion of a polyolefin and polyethylene terephthalate, the laminated sheet is drawn, and the polyethylene terephthalate is then separated from the laminated sheet to obtain an ultra-thin film. This publication also suggests that a metal may be vacuum-deposited on this ultra-thin film.

There are many methods known in which different polymers are laminated, the laminate is drawn, and one polymer film is separated from the laminate to form an ultra-thin film. These known methods are disclosed in, for example, Japanese Unexamined Patent Publications Nos. 58-132520, 58-136417, 57-176125, and 52-37982. A defect of these known methods is that it is very difficult to obtain a long, unbroken ultra-thin film by continuously separating the ultra-thin film from a substrate film. In other words, the ultra-thin film is usually cut or broken during the separation. This is a serious obstacle to the practical working of these methods.

SUMMARY OF THE INVENTION

It is a primary object of the present invention to provide a method for making a capacitor element having an ultra-thin polyethylene terephthalate film as a dielectric layer.

Another object of the present invention is to provide a method for making a metal-deposited laminated film for a capacitor, in which the foregoing defects are eliminated; that is, operation adaptability is good and an ultra-thin film can be separated very easily.

In one aspect of the present invention, there is provided a method for making capacitor elements, which comprises cutting, into a predetermined width, a metal-deposited laminated film comprising an oriented ultra thin polyethylene terephthalate film having a thickness of 0.2 to 2.0 μm, on one surface of which a metal layer is formed by vacuum deposition and on the other surface of which a support film is bonded with an adhesive force of 0.1 to 2.0 g/cm, and forming a capacitor element by separating the metal-deposited polyethylene terephthalate film from the cut laminated film and, successively, forming the separated metal-deposited polyethylene terephthalate film into a coil.

In another aspect of the present invention, there is provided a method for making metal-deposited laminated film for a capacitor, which comprises an oriented polyethylene terephthalate film having a thickness of 0.2 to 2.0 μm, on one surface of which a metal is vacuum-deposited, and a propylene copolymer film bonded closely to the surface opposite to the metal-deposited surface of the polyethylene terephthalate film with an adhesive force of 0.1 to 2.0 g/cm.

DESCRIPTION OF THE PREFERRED EMBODIMENTS

Figure 1:
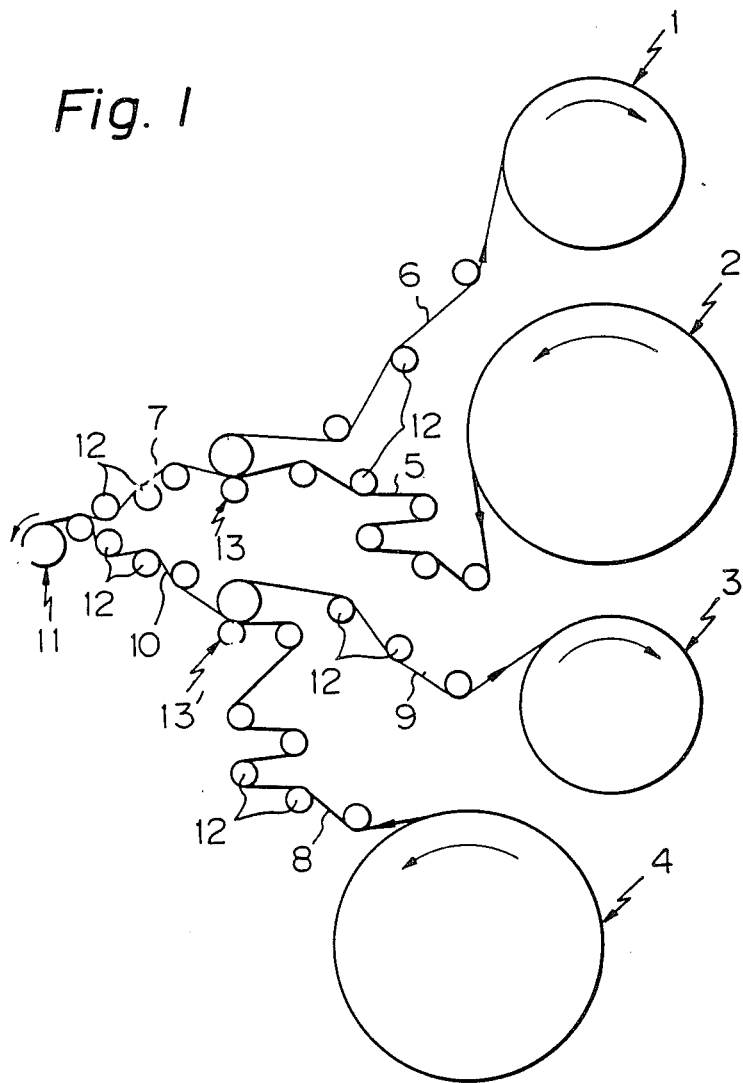
FIG. 1 illustrates an embodiment of the method for making capacitor elements according to the present invention.

One embodiment of the method for making capacitor elements from the metal-deposited laminated film according to the present invention will be illustrated with reference to FIG. 1. In FIG. 1, a metalized laminated film 5 having an aluminum/polyethylene terephthalate/propylene copolymer laminate structure is unwound from an unwinder 2 and is passed through guide rollers 12 to a pair of nip rollers 13 where the film 5 is separated into an aluminum/polyethylene terephthalate film 7 and a propylene copolymer support film 6. Similarly, a metalized laminated film 8 of the same laminate structure is unwound from an unwinder 4 and is passed through guide rollers 12 to a pair of nip rollers 13' where the film 8 is separated into an aluminum/polyethylene terephthalate film 10 and a propylene copolymer support film 9. The two propylene copolymer support films 6 and 9 are wound by winders 1 and 3, respectively. The two aluminum/polyethylene terephthalate films 7 and 10 are superposed one upon the other and wound into a roll to form a capcitor element 11 in the form of a coil. The unwinders 2 and 4 for the metalized laminated films 5 and 8 and the winders 1 and 3 for the support films 6 and 9 are independently driven by torque motors. A winder for forming the capacitor element 11 is driven by a D.C. motor.

The oriented polyethylene terephthalate film used in the method of the present invention is a film obtained by monoaxially or biaxially drawing a film of a polyester having an ethylene terephthalate unit content of at least 90 mole % to impart a molecular orientation to the film. The melting point of the polymer is at least 250° C., preferably at least 255° C. A copolymer with known comonomer units such as ethylene isophthalate units, butylene terephthalate units, ethylene adipate units, ethylene sebacate units or polyethylene glycol units is included within the broad scope of the term "polyethylene terephthalate" (referred to as "PET" hereinafter) as used in the present invention, so far as the ethylene terephthalate unit content is at least 90 mole %.

The thickness of the oriented PET film is 0.2 to 2.0 μm, preferably 0.2 to 1.0 μm. If the thickness of the oriented PET film is smaller than 0.2 μm, the film will be easily cut or broken during the separating or peeling operation and thus have little practical utility. If the thickness of the oriented PET film is larger than 2.0 μm, the PET film alone can be handled safely, and the formation of a laminated film as claimed in the present invention is not necessary.

The kind of metal to be vacuum-deposited on one surface of the PET film is not particularly critical, but aluminum, zinc, copper, and silver are preferred.

The metal layer vacuum-deposited on one surface of the oriented PET film facilitates the separation of the PET film from the support film. Preferably, the thickness of the vacuum-deposited metal layer is 0.03 to 0.3 μm, more preferably, 0.05 to 0.2 μm. If the thickness of the vacuum-deposited metal layer is too small and outside the above-range, it is difficult to maintain a sufficiently high quality of capacitor elements. Also, separation of the PET film is not facilitated by the metal layer much at all. If the vacuum-deposited metal layer is too thick and outside the above range, when a capacitor is fabricated by using the separated PET film, the self-healing function of the capacitor is poor.

It is an indispensable feature of the present invention that the adhesive force between the metal deposited PET film and the support film be 0.1 to 2.0 g/cm, preerably 0.2 to 0.8 g/cm. If the adhesive force is too large and outside the above range, the film will be easily cut or broken at the separation step. If the adhesive force is too small and outside the above-range, smooth separation is impeded with the result that formation of wrinkles is caused in the film. The thickness of the support film is preferably 5 to 30 μm.

As the support film, a propylene copolymer film is preferable. The propylene copolymer film is a film composed of a copolymer comprising 80 to 97 mole % of propylene and 3 to 20 mole % of at least one olefin having 2 to 8 carbon atoms, other than propylene. It is preferred that the propylene copolymer film has a melting point of 90° C. to 140° C. and a birefringence of 0 to 0.008, more preferably, 0 to 0.005. If the birefringence is too large and outside the above range, the vacuum-deposited PET film or the propylene copolymer film is liable to be easily cut or broken upon separation. As specific examples of the propylene copolymer (hereinafter referred to as "PPC"), there can be mentioned a propylene/ethylene copolymer, a propylene/butene copolymer, and a propylene/ ethylene/butene terpolymer. A random copolymer is preferred for the copolymerization mode, but a block copolymer may be used.

As means for maintaining the adhesive force between the PET film and the PPC film within the above-mentioned range, there is preferably adopted a method in which 0.001 to 1% by weight, more preferably, 0.005 to 0.5% by weight, of a non-granular lubricant is incorporated into the PET film and/or the PPC film.

The non-granular lubricant used is a substance having a melting point or softening temperature lower than 200° C. and imparting a lubricating property to the film, even if liquified or solidified at room temperature. Specific examples are described below. Where two or more of these substances are incorporated in the film, it is sufficient if the total amount is within the above-mentioned weight range.

Specific examples of the non-granular lubricant are as follows.

A. Aliphatic hydrocarbons such as liquid paraffin, microcrystalline wax, natural paraffin, synthetic paraffin, polyethylene wax, and polypropylene wax.

B. Higher fatty acids and metal salts thereof such as stearic acid, calcium stearate, hydroxystearic acid, hardened oil, and sodium montanate.

C. Fatty acid amides such as stearic acid amide, oleic acid amide, erucic acid amide, ricinoleic acid amide, behenamide, and methylene-bis-stearamide.

D. Fatty acid esters such as n-butyl stearate, methyl hydroxystearate, myricyl cerotinate, a polyhydric alcohol fatty acid ester, and an ester type wax.

E. Fatty acid ketones such as a ketone type wax.

F. Alphatic alcohols such as lauryl alcohol, stearyl alcohol, myristyl alcohol, and cetyl alcohol.

G. Fatty acid-polyhydric alcohol partial esters such as a glycerol fatty acid ester, hydroxystearic triglyceride, and a sorbitan fatty acid ester.

H. Non-ionic surface active agents such as a polyoxyethylene alkyl ether, a polyoxyethylene phenyl ether, a polyoxyethylene alkylamide, and a polyoxyethylene fatty acid ester.

I. Silicone oils such as a linear methylsilicon oil, a methylphenylsilicone oil, and a polyoxyalkylene glycol-modified silicone oil.

J. Fluorine-containing surface active agents such as a fluoroalkylcarboxylic acid, a perfluoroalkylcarboxylic acid, a monoperfluoroalkyl ethyl phosphate, and a perfluoroalkylsulfonic acid salt.

If an inorganic fine particle having an average particle size of 0.001 to 1 μm, such as silica made by a dry or wet process, zeolite, calcium carbonate, calcium phosphate, kaolin, kaolinite, clay, talc, titanium oxide, alumina, zirconia, or aluminum hydroxide, is incorporated in an amount of 0.01 to 0.5% by weight in the PET film and/or the PPC film in combination with the above-mentioned non-granular lubricant, the effect of the non-granular lubricant is synergistically enhanced in many cases.

The laminate structure of the laminated film of the present invention is not limited to the metal/PET/PPC three-layer structure. For example, there may be adopted a metal/PET/PPC/PET/metal five-layer structure. This five-layer structure is advantageous in that since an ultra-thin vacuum-deposited PET film can be separated from each of the surfaces of one laminated film, two ultra-thin metal-deposited films can be obtained at a time and a capacitor element can be fabricated only by coiling these two films.

An embodiment of the process for the preparation of the metal-deposited laminated film of the present invention will now be described, though the preparation process is not limited to this embodiment.

Pellets of PET (having a melting point of 260° C. and containing 0.1% by weight of sodium montanate and 0.1% by weight of dry-process silica having an average particle size of 0.03 μm) and pellets of PPC (propylene/ethylene copolymer having an ethylene content of 6% by weight and a melting point of 122° C. and containing 0.4% by weight of erucic acid amide and 0.4% by weight of zeolite having an average particle size of 0.8 μm) are supplied to different extruders, respectively, and melt-extruded at 280° C. The melts are joined in a T-type die to obtain a film having a PET/PPC/PET three-layer structure. The film is heated at 90° C., drawn at a draw ratio of 3.2 in the longitudinal direction, once cooled, heated again at 100° C., and drawn at a draw ratio of 3.2 in the lateral direction. The drawn film is transferred into a hot air zone conditioned at 200° C. without cooling while keeping the film under tension, whereby the film is heat-treated at this temperature for 5 seconds. By this heat treatment (the heat treatment temperature is higher than the melting point of PPC but lower than the melting point of PET), the birefringence of the PPC film can be adjusted to be within the range of 0 to 0.008, preferably 0 to 0.005.

The heat-treated film is then gradually cooled to room temperature to obtain a laminated film comprising a center PPC layer having a thickness of 15 μm and PET layers each having a thickness of 0.5 μm, which are bonded closely to both sides of the PPC layer, respectively.

The thus-obtained film is placed in a vacuum deposition vessel and a metal is vacuum-deposited on the surfaces of the polyester films according to customary procedures. As the vacuum deposition method, there can be adopted known methods such as a resistance heating method, an electron beam heating method, a sputtering method, and an ion plating method. A margin necessary for a capacitor may be formed at this vacuum deposition step. More specifically, a portion to be used as a margin is formed in such a manner that the evaporated metal is prevented from deposition onto that portion of the film surface. For example, a masking tape is placed between a metal source and the surface of the film in such a manner that the metal is not deposited on the portion of the film surface confronting the tape. If the masking tape is placed in parallel to the continuous film, a margin continuous in the longitudinal direction of the film can be formed, and if the masking tape is placed in a position intersecting the running direction of the film, a margin extending in the lateral direction of the film or in an oblique direction can be formed. A margin can be also formed according to a method in which a metal is vacuum-deposited on the entire surface of the film and, thereafter, the deposited metal is removed by corona discharge or irradiation with laser beams from a portion to be used as a margin. A combination method may be also adopted in which a margin is formed at the vacuum deposition step and another margin is formed after the vacuum deposition.

According to the above-mentioned procedures, there can be obtained a laminated film comprising a propylene copolymer film and a metal-deposited, oriented polyester film bonded closely to the propylene copolymer film.

The thus-prepared metal-deposited laminated film is slit in a predetermined width, and the metal-deposited polyester film is separated and successively formed into a capacitor element, whereby the production of capacitor elements can be greatly facilitated.

According to the conventional technique, a metal-deposited polyester film is separated from a polyolefin support film and wound, and the polyester film is slit in an optional width and wound. Then, the film is taken out from the wound roll and formed into a capacitor element. In contrast, according to the present invention, the operations up to the slitting operation are conducted in the state wherein the film is laminated, and the metal-deposited polyester film is separated from the obtained roll of the laminated film and directly coiled directly into a capacitor element. According to this method, the operation of winding the ultra-thin, metal-deposited polyester film in this form can be omitted at least two times as compared with the frequency of this operation in the conventional technique. Accordingly, the occurrence of wrinkles or scratches is greatly reduced, and thus insulation defects are reduced in the formed capacitor elements and the rejection rate for the capacitors is decreased. Note, the capacitor element referred to in the present invention means not only a coiled capacitor element which is used as it is in the coiled form but also an intermediate wound roll for the fabrication of a laminated capacitor.

When a laminated capacitor is made according to the process of the present invention, the following operations are performed. An organic solvent solution of a resin (such as polycarbonate) as an adhesive is coated on the metal-deposited surface of a laminated film comprising a propylene copolymer film and a metal-deposited polyester film, and the coated surface is dried by hot air to form a coating layer having a thickness of 0.1 to 2.0 μm. Then, the coated metal-deposited polyester film is separated from the propylene copolymer film and is wound in a flat form to obtain an intermediate wound roll. The roll is heated and pressed by means of a press to obtain a laminated sheet in which several hundreds to several thousands of metal-deposited film layers are laminated together. The laminated sheet is cut into a laminated capacitor chip having an optional size (for example, 3 mm×5 mm), and a metal is melt-sprayed on both end faces of the chip to form electrodes. Thus, a laminated capacitor is obtained. In this embodiment also, since the metal-deposited polyester film is separated from the laminated film and directly formed into an intermediate wound roll, the rejection rate in laminated capacitors can be reduced.

According to the present invention, the following advantages can be attained by the adoption of the structure in which a metal is vacuum-deposited on one surface of an oriented PET film having a thickness of 0.2 to 2.0 μm, preferably 0.1 to 1.0 μm, and a PPC film is bonded closely to the opposite surface of the PET film with an adhesive force of 0.1 to 2 g/cm.

(a) Since an ultra-thin, metal-deposited PET film can be obtained continuously in a good condition, a capacitor having a small size and a high capacitance can be fabricated.

(b) Since the slitting and coating operations can be performed in the state where the ultra-thin, metal-deposited PET film is bonded to the PPC film, the operation adaptability is improved.

(c) Since wrinkling, breakage or cutting is minimized at the step of separating the metal-deposited PET film from the PPC film, the operation adaptability is improved.

(d) Since the PPC film left after separation of the metal-deposited PET film can be used again by pulverizing the PPC film and incorporating the pulverized product into the starting material of the PPC film, the present invention is advantageous from the economical viewpoint.

(e) Since a capacitor element can be made continuously while separating the metal deposited PET film from the metal-deposited laminated film cut to a predetermined width, the fabrication operation can be simplified and the rejection rate can be reduced in formed capacitor elements.

The physical properties of films used in the specification are determined as follows.

(1) Thickness of Film

With respect to films having a thickness larger than 1 μm, the thickness is measured by a dial gauge. Where a film has a thickness of 1 μm or less, the film is put on a glass support in the unwrinkled state, the assembly is set at a tracing type surface roughness meter, and the step in the boundary between the film-present portion and the film-absent portion is measured. The measured value is designated as the film thickness.

(2) Thickness of Vacuum-Deposited Metal Layer

With respect to each metal, the value of the electric resistance is measured and converted to the thickness by utilizing the relationship between the thickness of the metal-deposited layer and the electric resistance thereof.

(3) Melting Point

The temperature is elevated at a rate of 20° C./min by using DSC, and the temperature corresponding to the apex of the endothermic peak by melting is designated as the melting point (the sample amount is 10 mg).

Where at least two melting point peaks are observed, the temperature corresponding to the apex of the higher peak is designated as the melting point.

(4) Birefringence

Refractive indexes of the film in the longitudinal and lateral directions are measured by an Abbe refractometer, and the absolute value of the difference between the two measured values is designated as the birefringence.

(5) Adhesive Force

The metal-deposited PET film layer is continuously separated from the metal-deposited laminated film having a width of W cm at a peeling angle of 180° and a separating speed of 2 m/min, and the tension imposed on the metal-deposited PET film at this separation step is measured by a tensiometer. If the measured tension is T (g), the adhesive force is determined by T/W (g/cm).

The present invention will now be described in detail with reference to the following examples.

EXAMPLE 1

The following two starting materials (pellets) were prepared.

PET: Polyethylene terephthalate copolymerized with 0.2% by weight of diethylene glycol, which had a melting point of 258° C. and contained 0.08% by weight of calcium montanate and 0.15% by weight of dry-process silica having an average particle size of 0.05 μm.

PPC: Propylene/ethylene random copolymer having an ethylene content of 5.5% by weight and a melting point of 125° C. and containing 0.5% by weight of stearic acid amide and 0.4% by weight of kaolinite having an average particle size of 0.7 μm.

Both the starting materials were supplied into different extruders, respectively, and melt-extruded at 280°, and the melts were joined in a T type die to form a film having a PET/PPC/PET three-layer structure. The film was wound on a cooling drum maintained at 25° C. and was cooled and solidified to obtain a three-layer laminated film. Each of the outside PET layers had a thickness of 5 μm and the central PPC layer had a thickness of 150 μm.

The film was heated at 90° C., drawn at a draw ratio of 3.1 in the longitudinal direction, and immediately cooled to 30° C. Then, the film was heated again at 100° C., drawn at a draw ratio of 3.2 in the lateral direction, heat-treated at 200° C. for 6 seconds while keeping the film under tension, gradually cooled to room temperature, and then wound. In the obtained film, the thickness of the PET layers on both sides was 0.5 μm, the thickness of the central PPC layer was 15 μm, and the birefringence of the PPC layer was 0.01. When continuous separation of the surface PET layers was tried in this state, the films were sometimes broken and continuous separation could not be performed smoothly.

This laminated film was placed in a vacuum deposition vessel, and aluminum was vacuum-deposited in a thickness of 0.08 μm on the surfaces of the PET layers on both sides at a vacuum degree of $10^{-5}$ mmHg and film-running speed of 30 m/min. This produced a five-layer film structure comprising aluminum/PET/PPC/PET/aluminum. When continuous separation of the metal-deposited PET layers from the thus-obtained metal-deposited laminated film was carried out, the formation of wrinkles and the breaking or cutting of the films were substantially controlled, and an excellent quality, long, ultra-thin, metal-deposited PET film was obtained. The adhesive force between the PET layer and the PPC layer was 0.4 g/cm.

The resulting fine-layer metal-deposited laminated film was microslitted in a width of 1 cm, and the both metal-deposited PET films were continuously separated from both sides of the fine-layer structure, and the two separated films were piled and coiled to form a capacitor element. The capacitor element was heat-pressed, and a metal was flame-sprayed at both ends to form electrodes, whereby a capacitor having a capacitance of 0.1 μF and excellent electric characteristics was obtained.

EXAMPLE 2

The following two starting materials were prepared.

PET: Polyethylene terephthalate copolymerized with 0.3% by weight of diethylene glycol, which had a melting point of 257° C. and contained 0.1% by weight of myricyl cerotinate (carnauba wax) and 0.2% by weight of dry-process silica having an average particle size of 0.05 μm.

PPC: Propylene/ethylene/butene random terpolymer having an ethylene content of 4% by weight, a butene content of 1.5% by weight and a melting point of 122° C. and containing 0.3% by weight of calcium stearate, 0.2% by weight of behenamide and 0.4% by weight of calcium carbonate having an average particle size of 0.9 μm.

The two starting materials were supplied into different extruders, respectively, and melt-extruded at 280° C., and the melts were joined in a polymer pipe to form a PET/PPC/PET three-layer structure. The three-layer melt was guided into a T type die to obtain a three-layer laminated film. The film was wound on a cooling drum maintained at 30° C. and was cooled and solidified. In the obtained three-layer laminated film, the thickness of each of the PET layers on both sides was 4 μm, and the thickness of the central PPC layer was 140 μm. The film was heated at 95° C. and simultaneously drawn in both longitudinal and lateral directions at a draw ratio of 3.2 in each direction, heat-treated at 210° C. for 5 seconds while keeping the film under tension, and was gradually cooled to room temperature. In the obtained film, each of the PET layers on both sides had a thickness of 0.4 μm, and the central PPC layer had a thickness of 14 μm and a birefringence of 0.005. When continuous separation of the surface PET layers was tried in this state, the films were sometimes broken and continuous separation could not be performed smoothly.

The laminated film was placed in a vacuum deposition vessel and aluminum was vacuum-deposited in a thickness of 0.07 μm on the surfaces of the PET layers on both sides according to customary procedures. An organic solvent solution of polycarbonate was coated on the metal-deposited surfaces of the metal deposited laminated film and the coated surfaces were dried so that the thickness of the coating layer was 0.4 μm. The three-layer film having the PET/metal deposited layer/coating layer was separated from the PPC substrate layer, and separation could be continuously performed in a good condition. The adhesive force between the PET layer and the PPC layer was 0.3 g/cm. The two-coated, metal deposited PET films were continuously separated from both sides of one laminated film, respectively, and the two separated films were piled and lap-wound on a flat plate. Then, the flat plate was removed, and the remaining flat film roll was heat-pressed to form a laminate comprising 1000 film layers. A chip having a size of 6 mm×8 mm was cut from the laminate, and electrodes were attached to the chip to obtain a laminated capacitor. The electric characteristics of this laminated capacitor were very good.

We claim:

1. A method for making capacitor elements having an ultra thin dielectric layer which comprises:

cutting, in a predetermined width, a metal-deposited laminated film comprising an oriented ultra thin polyethylene terephthalate film having a thickness of 0.2 to 2.0 μm, on one surface of which a metal layer is formed by vacuum deposition and on the other surface of which a propylene copolymer film as a support film is bonded with an adhesive force of 0.1 to 2.0 g/cm, and forming capacitor elements by separating the metal-deposited polyethylene terephthalate film from the cut laminated film and forming the metal-deposited polyethylene terephthalate film into a coil.

2. A method according to claim 1, wherein the oriented polyethylene terephthalate film has a thickness of 0.2 to 1.0 μm.

3. A method according to claim 1, wherein the adhesive force is 0.2 to 0.8 g/cm.

4. A method according to claim 1, wherein the support film has a thickness of 5 to 30 μm.

5. A method according to claim 1, wherein the propylene copolymer film has a birefringence of 0 to 0.008.

6. A method according to claim 1, wherein the propylene copolymer film is made of a copolymer composed of 80% to 97% by mole of units derived from propylene and 3 to 20% by mole of units derived from at least one olefin having 2 to 8 carbon atoms, other than propylene, and having a melting point of 90° to 140° C.

7. A method according to claim 1, wherein the oriented polyethylene terephthalate film is composed of a polyester having an ethylene terephthalate unit content of at least 90% by mole and a melting point of at least 250° C.

8. A method according to claim 1, wherein the deposited metal layer has a thickness of 0.03 to 0.3 μm.

9. A method according to claim 1, wherein said metal-deposited laminated film has a deposited metal/polyethylene terephthalate/propylene copolymer three layer structure.

10. A method according to claim 1, wherein said metal-deposited laminated film has a deposited metal/polyethylene terephthalate/propylene copolymer/polyethylene terephthalate/deposited metal five layer structure.

11. A method for making capacitor elements having an ultra thin dielectric layer which comprises:

cutting, in a predetermined width, a metal-deposited laminated film comprising a deposited metal/polyethylene terephthalate/propylene copolymer/polyethylene terephthalate/deposited metal five-layer structure, each of said polyethylene terephthalate layers being an oriented ultra thin polyethylene terephthalate film having a thickness of 0.2 to 2.0 μm, each of said deposited metal layers being formed by vacuum deposition, and said propylene copolymer layer being bonded on both of its surfaces to said polyethylene terephthalate layers with an adhesive force of 0.1 to 2.0 g/cm, and separating both of the metal-deposited polyethylene terephthalate films from the propylene copolymer layer and forming said metal-deposited polyethylene terephthalate films into a coil.

12. In a method for making a capacitor, the steps which comprise forming a metal-deposited laminated film comprising an oriented ultra thin polyethylene terephthalate film having a thickness of 0.2 to 2.0 μm having on one of its surfaces a metal layer formed by vacuum deposition, and having on its other surface a propylene copolymer film bonded to said other polyethylene terephthalate surface with an adhesive force of 0.1 to 2.0 g/cm.

separating said polyethylene terephthalate film with its metal-deposited surface from said propylene copolymer film and continuously rolling it into a capacitor coil having a multiplicity of layers, and applying electrodes to the resulting capacitor.

* * * * *

UNITED STATES PATENT AND TRADEMARK OFFICE
CERTIFICATE OF CORRECTION

PATENT NO. : 4,756,064
DATED : July 12, 1988
INVENTOR(S) : Toshiya Yoshii and Kazuo Okabe It is certified that error appears in the above-identified patent and that said Letters Patent is hereby corrected as shown below:

On the first sheet of the patent, at item [30], kindly delete "58-18244" and insert --59-18244--.

Signed and Sealed this

Seventh Day of February, 1989

Attest:

DONALD J. QUIGG

Attesting Officer

Commissioner of Patents and Trademarks